United States Patent [19]
Register

[11] Patent Number: 5,440,502
[45] Date of Patent: * Aug. 8, 1995

[54] STYLUS OPERABLE COMPUTER WITH WIRELESS KEYBOARD IN STORAGE BAY

[75] Inventor: David S. Register, Austin, Tex.

[73] Assignee: Dell USA, L.P., Austin, Tex.

[*] Notice: The portion of the term of this patent subsequent to Aug. 31, 2010 has been disclaimed.

[21] Appl. No.: 814,733

[22] Filed: Dec. 26, 1991

[51] Int. Cl.6 .................. G12B 9/00; H05K 5/02; H04B 10/00

[52] U.S. Cl. .................. 364/708.1; 395/155; 340/706; 340/711; 340/712; 361/393; 361/681; 361/729; 361/686; 345/168; 345/179; 359/142; 359/154; 364/DIG. 1

[58] Field of Search ............... 361/393, 686, 729, 681; 178/18, 19; 340/706, 700, 711, 710, 712, 713, 714, 715; 359/142, 159; 345/168, 179; 395/155; 364/708, DIG. 1 MS File, DIG. 2 MS File

[56] References Cited

U.S. PATENT DOCUMENTS

| | | | |
|---|---|---|---|
| 4,704,604 | 11/1987 | Fuhs | 340/700 |
| 4,926,010 | 5/1990 | Citron | 178/18 |
| 4,937,563 | 1/1990 | Shekita et al. | 340/700 |
| 5,034,858 | 7/1991 | Kawamoto et al. | 361/394 |
| 5,103,376 | 4/1992 | Blonder | 361/393 |
| 5,107,402 | 4/1992 | Malgouires | 361/393 |
| 5,175,672 | 12/1992 | Conner et al. | 361/393 |
| 5,189,534 | 2/1993 | Lin et al. | 359/142 |
| 5,200,913 | 4/1993 | Hawkins et al. | 364/708 |
| 5,206,790 | 4/1993 | Thomas et al. | 361/380 |
| 5,241,303 | 8/1993 | Register et al. | 340/706 |
| 5,264,992 | 11/1993 | Hogdahl et al. | 367/681 |
| 5,276,123 | 11/1993 | Boothroyd et al. | 361/680 |
| 5,283,862 | 2/1994 | Lund | 395/155 |

Primary Examiner—Robert B. Harrell
Assistant Examiner—Timothy L. Philipp
Attorney, Agent, or Firm—Robert Groover; James Huffman

[57] ABSTRACT

A pen-operable computer which also functions as a fully keyboard-operable computer. The keyboard contains an independent power supply, and is linked to the main chassis only by an infrared interface. The system chassis is very compact, but includes a full-width docking bay into which the keyboard can be latched for storage. When keyboard interface is desired, the user takes the keyboard module out of its docking bay and uses it in whatever position is most comfortable. When keyboard interface is not desired, the user simply snaps the keyboard module back into its docking bay for safe storage and/or transport.

13 Claims, 7 Drawing Sheets

FIG. 3A CLOSED

FIG. 3B KB REMOVAL

FIG. 3C STAND SETUP

FIG. 3D ROTATE TO KEYBOARD MODE

STYLUS OPERABLE COMPUTER WITH WIRELESS KEYBOARD IN STORAGE BAY

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

The following applications are assigned to the same assignee, contain at least one drawing in common with the present application, are believed to have effective filing dates identical with that of the present application, and are all hereby incorporated herein by reference:

Ser. No. 07/814,028 filed Dec. 26, 1991 and entitled "Portable computer with Screen Reversible for Stylus and Keyboard Entry";

Ser. No. 07/814,338 filed Dec. 26, 1991 and entitled "Portable Computer with Physical Reconfiguration of Display Connection for Stylus and Keyboard Entry", now U.S. Pat. No. 5,241,303; and Ser. No. 07/814,732 filed Dec. 26, 1991 and entitled "Stylus-Operated Computer with Folding Cover Convertible to Display Stand".

BACKGROUND AND SUMMARY OF THE INVENTION

The present invention relates to computer systems (and particularly to small computer systems), and to methods for using them.

The innovations disclosed in the present application provide computer systems (especially very small portable personal computers) which have advantageous new capabilities. To better explain the significance and advantages of these innovations, the following paragraphs (down to page 9) will review some technological context. This technological context is not necessarily prior art, but is intended to help in pointing out the disclosed inventions.

Stylus-Operable Computers[1]

As portable computers have continued to shrink, continuing efforts have been made to identify a new input channel to replace the keyboard. A great deal of design effort was needed to design notebook computers with a compacted keyboard which still had the key spacing to permit touch typing. However, at sizes below the "notebook" computer, there is no simply no room for a keyboard with standard key spacing and number of characters.

[1]Stylus-input computers are also commonly referred to as "pen-based" computers, or "slate" computers.

Thus, in the 1990s a great deal of activity has been devoted to computer systems which can be operated by a user using a stylus as a primary input device. Such an input device has many advantages: it is inherently very well suited to menu-based command inputs. It is inherently well suited to use with a small screen, since whatever screen area is available can be allocated among various boxes which can be checked or written in by the user. It is also inherently well suited to use by marginally literate persons, and to rapid input in environments where a user's full attention—in place thereof is not available, since the interface is inherently well-suited to graphical rather than character-based input.

In order to realize the full potential of stylus entry as an input channel, some degree of recognition capability for handwritten stylus inputs is necessary. It appears that the processor capability, power-management capability, and display and touch screen technology required for such computers is now available. Large improvements in operating system software technology in this area are to be expected, but a first generation of Functional system software is already available. However, a great deal of improvement remains for making this class of computers adequately comfortable and user-friendly.

Thus, as available computing power increases, stylus-capable computers (using recognition of handwritten inputs by a stylus acting upon the display surface) are becoming more practical.

A number of companies have recently announced pen-based computer products. See, for example, Shipley, "Pen-based PCs ready for prime time," in PC-COMPUTING, vol.4 no. 11 (Nov. 1991), at 214ff, which is hereby incorporated by reference. This and other articles[2] discuss machines announced by vendors including Tusk, Momenta, Grid, NCR, Samsung, Pi Systems, TelePad Inc. and other vendors.

[2]See also Schroeder et al., "Momenta to head parade of pen PCs: firm to bundle new machine with proprietary OS, applications," in PC WEEK vol.8 no.39 (Sep. 30, 1991), at page 4; Davis, "NCR's pen-based PC signals the birth of a new market," in PC WEEK vol.8 no.27 (Jul. 8, 1991) at page 134; Catchings et al., "NCR NotePad delivers 3-in-1 pen computing," in PC WEEK vol.8 no.26 (Jul. 1, 1991) at pages 1-2; all of which are hereby incorporated by reference.

In particular, portable computer applications are attractive candidates for stylus input systems, as mobile users often must enter data while standing, holding the computer unit in one hand, and the stylus in the other. For example, it has been suggested that a small portable dedicated computer, for specialized data entry or control applications, could advantageously be configured so that the user could hold the unit in one hand while marking on it with a stylus in the other hand.

Touch-Screen Menu Selection

An older system architecture, which attempted to fill some of these needs, used touch-screen input for menu selection. For example, a user would be shown a menu with 8 boxes on the screen; and when the user touched one box, a new menu (with a new set of options depending on which box the user had previously touched) would appear.

For special applications, where custom software can be developed, such menus offer rapid access to a range of commands. Moreover, such systems provide a simple interface and compact size, but are inherently very limited in their ability to deviate from a standard menu sequence, or to accept unexpected user input. Thus, such a user interface is not very suitable to a general purpose computer.

It should also be noted that the technology of such simple touch-screen computers differs very substantially from that of the stylus-operated computers which are now beginning to appear. A general-purpose stylus-operated computer must have some capability for recognizing handwriting (at least hand-printed letters, if not script). Thus, a relevant hardware parameter is the dimensional resolution of the touch-screen input: the spatial resolution needed for touch menu selection can be as coarse as a centimeter or more, whereas the spatial resolution needed for recognition of handwritten inputs should probably be 200 or more per inch.

Handwriting Recognition

Automatic recognition of handwritten inputs is an area which has been the subject of significant research effort in a large-computer environments. Sophisticated algorithms for handwriting recognition have been developed, but previously there was no driving application to migrate these algorithms to microcomputer-based hardware.

Stylus-Capable Operating Systems

Of course, pen-sensitive hardware would not be useful without appropriate software. Specifically, a viable pen computer market requires system software which can handle a user's pen inputs and pass them in a standard fashion to the application software.

This has been a very active area of development in the 1990s. Currently the leading pen-based operating systems are PenPoint TM from Go Corp. and PenWindows TM from MicroSoft TM, but further rapid developments in this area are to be expected.

The Stylus

A variety of technologies can be used to allow the computer system to sense the position of the stylus point[3], but the choice of those technologies is not particularly relevant to the present invention.

[3] Penpoint technologies may use an "active" stylus, which contains electronic circuits, or a purely passive stylus, which simply functions as a conductive element to contact a matrix of conductors, or even simply as a mechanical element to contact a 2-dimensional-sensing surface at a certain point. An active stylus may be cabled to the computer chassis or may be wireless.

Light Pen

Computer researchers have recognized for many years that stylus input, onto a display screen which was also a stylus-sensitive input screen, was an attractive input technology. Thus, for example, as early as the 1960s some large high-cost computers used a "light pen" interface, where the computer could sense the position of a stylus which the user held up to the screen.[4] However, a protracted session of light pen use on a large vertical display can rapidly become extremely uncomfortable to the user's arms and shoulders. Thus, light pen technology never achieved widespread use.

[4] With a raster-scanned CRT display, this can be accomplished by connecting a photo-detector to sense illumination at the tip of the stylus. By looking for a pulsed component at the frame scan frequency, and then finding the phase of these pulses with respect to the vertical and horizontal blanking intervals, the X-Y position of the stylus within the raster scan field can be directly determined. The light pen could be, for example, simply an optical fiber connected to a transparent stylus tip, with the optical fiber plugged into a photo-detector on the computer chassis (or terminal chassis).

Combined Stylus and Keyboard Input

It is generally acknowledged, however, that a conventional keyboard is a faster means of data entry provided that both hands are free to type and the keyboard and display are in an ergonomically acceptable configuration. Thus, a computer which is easily converted from a dedicated clipboard-type stylus input configuration into a conventional clamshell keyboard input notebook configuration, and vice versa, is desirable.

Several attempts have been made to address the problem of both keyboard and stylus input. (Examples of such efforts include the Tusk and Momenta products in the articles cited above.)

One attempt which has been made to reconcile these demands was to provide a clipboard-type computer with a remote keyboard connected by an electrical cable. This structure is believed to be incorporated, for example, in the Momenta and Grid computers now available. The disadvantage of this is that the keyboard is not integral to the computer, thus requiring the carrying and storage of an additional system component if keyboard data entry is anticipated. However, an advantage of this approach is that, if keyboard data entry is never needed, the system unit may be smaller and lighter.

Another suggestion was a clipboard-type computer which uses software to generate an image of a keyboard on the display. The user activates specific keystrokes by touching or tapping the display surface with the stylus. (This structure is believed to be incorporated, for example, in the Grid computer now available.) The disadvantage of this is that it is not compatible with touch-typing, and thus gives slow character entry speed. However, an advantage is that the simulated keyboard is integral with the system, requires no additional components, and does not any size or weight.

Ergonomics

Mobile users often must enter data while standing, holding the computer unit in one hand (with the display exposed and firmly supported), and the stylus in the other. In a sitting position, it should also be possible to use the stylus with one hand while balancing the computer on the user's knee, leaving one hand free.

On the other hand, a palmtop computer used for typing must meet the same criteria as any other keyboard-entry device: the typing position should permit a seated user to keep both hands on the keyboard, and to see the display clearly, without strain in wrists, upper back, or neck.

The question is how the capability for both stylus input and keyboard entry can be achieved. It is difficult enough to achieve any sort of keyboard input capability, in a very small portable computer, which is adequate for rapid typing. It is even more difficult to combine this input with a capability for stylus input.

A particular problem is the ergonomics of display access. When the user is using the stylus, the display screen unit should ideally be thin and approximately flat (so the user can hold it in one hand or balance it on a knee); but when the user is using the keyboard, the unit should be supported in a position and configuration which makes the screen easily readable (i.e. 50 to 90 degrees from horizontal). No known design has provided a stand which is stable and provides this support angle and does not detract from the portability of the computer.

In particular, such a computer would typically be used in very confined spaces (such as the snack tray of a coach airline seat). In such spaces, minimizing footprint is a key consideration. Ideally such a stand should not increase the computer's footprint at all, whether the stand is folded up or in use.

Innovative Computer System and Method

The present application teaches a novel computer system which does provide convenient and ergonomically advantageous capability for both keyboard input and stylus input. A primary system chassis contains the CPU and the power supply, and other key components. (The display may be mounted on the system chassis, or may be in a separate detachable module.) The keyboard contains an independent power supply, and is linked to the main chassis only by an infrared interface. The system chassis is very compact, but includes a full-width docking bay into which the keyboard can be latched for storage. When keyboard interface is desired, the user takes the keyboard module out of its docking bay and uses it in whatever position is most comfortable. When keyboard interface is not desired, the user simply snaps the keyboard module back into its docking bay for safe storage and/or transport.

This configuration is believed to be a new approach to reconciling the demands of keyboard operation and stylus operation. For optimal keyboard operation, the keyboard should preserve a key pitch which is large enough for touch typing, and should preferably permit the user to adjust the spacing between keyboard and display. For optimal stylus operation, the computer should be small enough to be easily held in one hand. In general, the teaching of the art has been that size is critical, and should be minimized, for stylus operation.

However, the problem which results from the conventional approach is: what is to be done with the keyboard while operating in stylus mode. One approach has been to clock a stylus computer to a keyboard module when keyboard operation is desired. This approach permits the user to have keyboard capability whenever he returns to wherever he left the keyboard; but obviously this approach does not provide as much portability as would be desirable.

The present invention teaches that—contrary to the general trend to minimize the bulk of stylus-operable computers—a bay should be added in the system chassis, merely to hold the keyboard. This bay preferably runs the full width of the computer chassis, to permit the keyboard to be as wide as possible within the overall dimensions of the system.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Following is a sample specific implementation of hardware portions of the disclosed innovations. This example is intended to better illustrate the disclosed generally applicable innovations, and to comply with the best-mode requirements of U.S. patent law; but of course this specific implementation is subject to change (and will certainly be changed as time goes by), and can be altered, as will be apparent to those skilled in the art, in many details.

Figure 1:
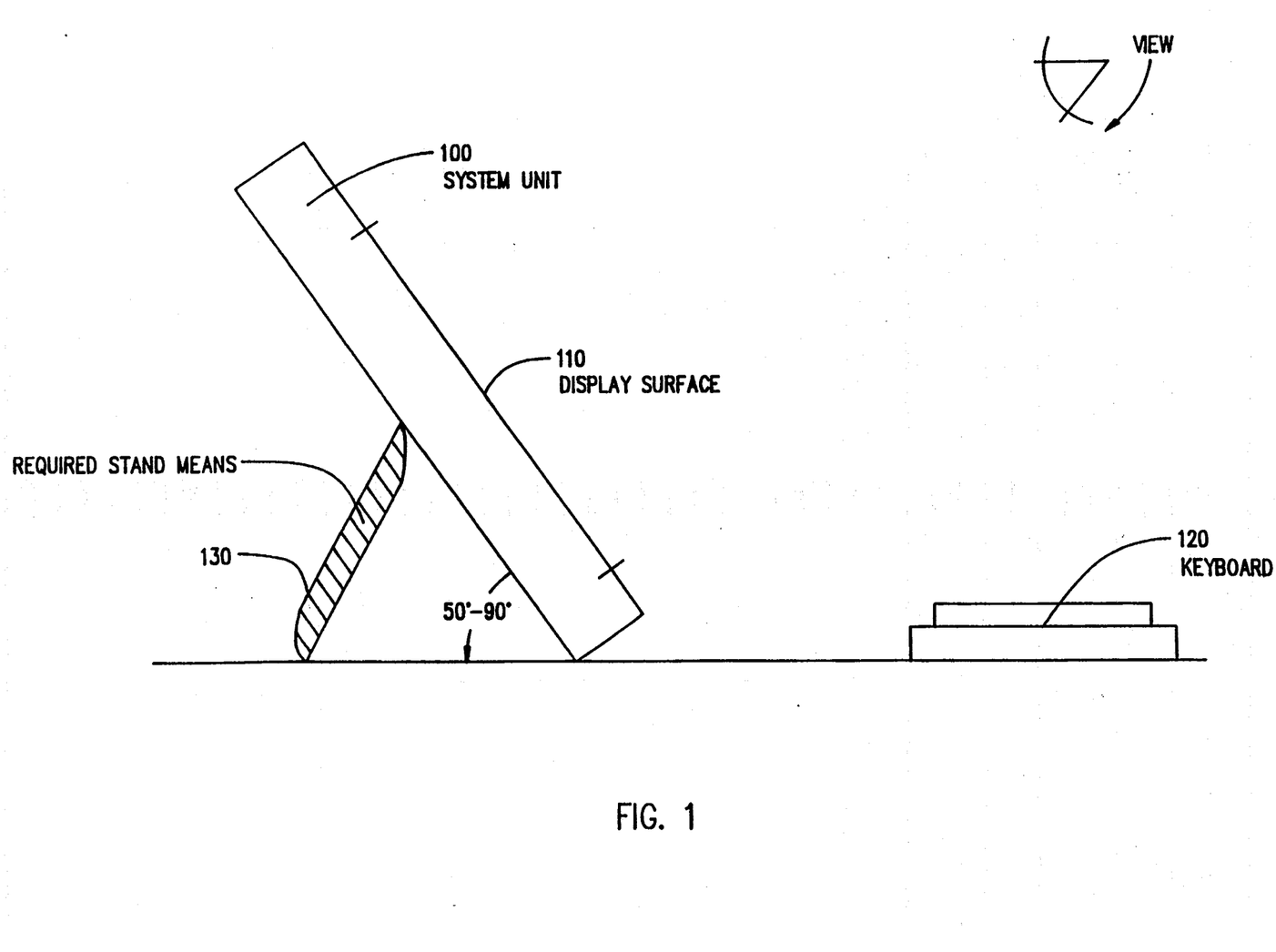
FIG. 1 shows the ergonomically preferable position, in relation to the user's eye position, for keyboard input.

FIG. 1 shows the ergonomically preferable position, in relation to the user's eye position, for keyboard input. The keyboard 120 lies on a flat surface (such as a table) in front of the user. The system chassis, which includes a touch screen display 110 in its front surface, needs to be supported so that the display surface is readily visible. (Ideally the surface of display 110 should be normal to the user's line of sight, but there is some room for adjustment of this parameter.) In order to achieve this angle with a thin flat system chassis 100, some sort of support stand 130 needs to be provided.

Figure 2:
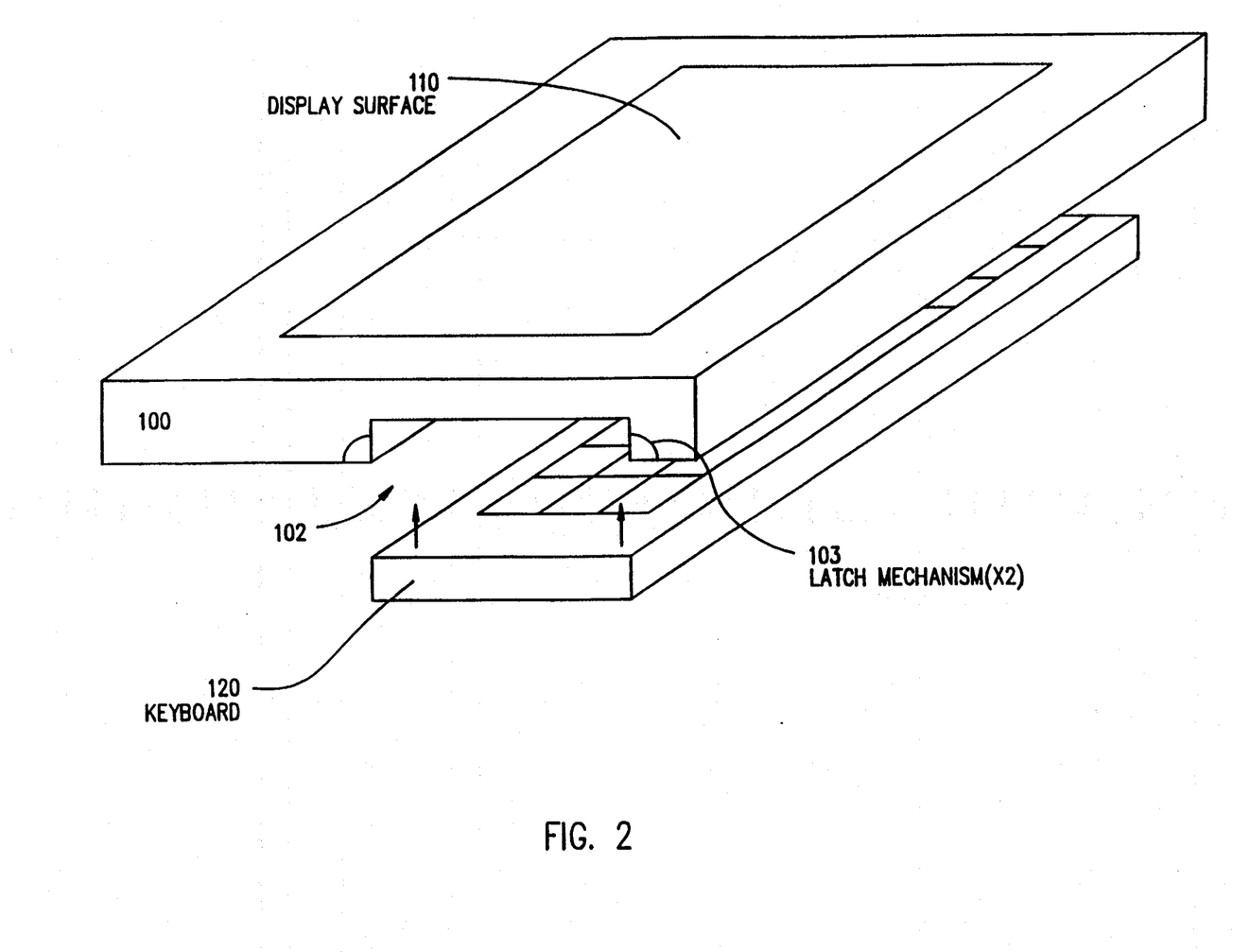
FIG. 2 shows how the keyboard is detachably docked within the system chassis in the presently preferred embodiment.

FIG. 2 shows how the keyboard 120 is detachably docked within a recess 102 in the backside of the system chassis 100, in the presently preferred embodiment. The keyboard 120 may be detached when required by activating latches 103. These latches, in the presently preferred embodiment, are small and simple; they help to prevent accidental detachment, but note that in the closed position (shown in FIG. 3A) the folio cover 300 also helps to prevent accidental detachment. In use, the keyboard 120 communicates with the CPU (in system chassis 100) over a wireless data link, either IR (infrared) or RF (radio frequency). The keyboard derives power from one or more batteries contained within the keyboard housing.

FIGS. 3A–3D are a series of drawings showing sequential stages in reconfiguration of the system of the preferred embodiment from a closed position, suitable for safe one-handed carrying, to a position suited for efficient typing.

Figure 3A:
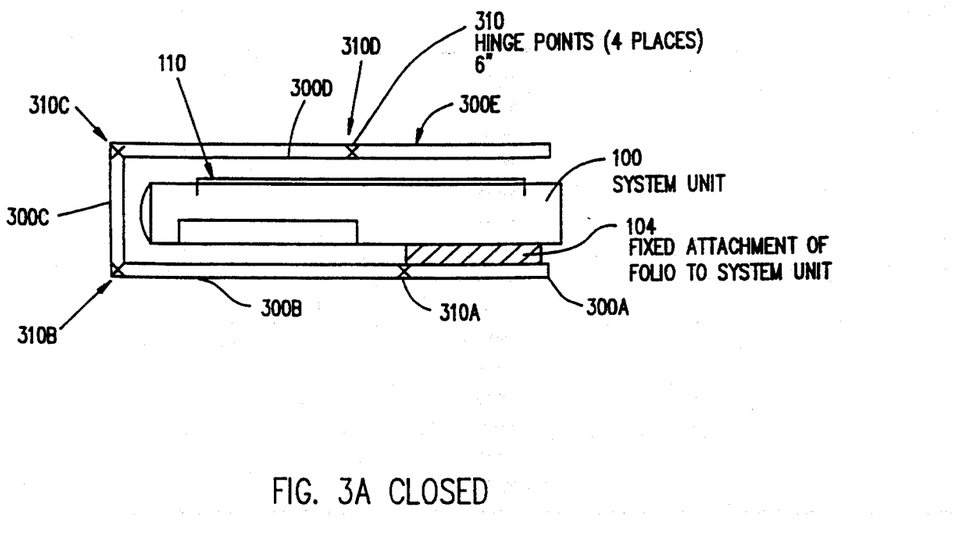
FIGS. 3A, 3B, 3C, and 3D are a series of drawings showing sequential stages in reconfiguration of the system of the preferred embodiment from a closed position, suitable for safe one-handed carrying, to a position suited for efficient typing.

FIG. 3A shows the system of the presently preferred embodiment in the closed position for transport. In this position the cover 300 covers and protects the display 110 on the front side of chassis 100, and also helps retain the keyboard 120 in its bay 102 in the back side of chassis 100.

Cover 300, in the presently preferred embodiment, is made of five rigid pieces joined by four hinge joints. Piece 300A is rigidly attached to the backside of chassis 110, and is preferably (in this sample embodiment) about 4" long in the dimension shown. (The dimensions of the pieces of the cover 300 are adapted to the dimensions of the system chassis in this specific sample embodiment, which is approximately 10" by 2" (in the plane of the paper) by 12" (in the direction normal to the paper)). Piece 300A is connected along its full width, by hinge 310A, to piece 300B, which is approximately 6" long (in this specific sample embodiment). Piece 300B is connected along its full width, by hinge 310B, to piece 300C, which is approximately 2" long (in this specific sample embodiment). Piece 300C is connected along its full width, by hinge 310C, to piece 300D, which is approximately 4" long (in this specific sample embodiment). Piece 300D is connected along its full width, by hinge 310D, to piece 300E, which is approximately 6" long (in this specific sample embodiment).

In the presently preferred embodiment, the hinges of cover 300 are not all of the same rigidity. In this sample embodiment hinge 310A is stiffer than hinge 310D, which is stiffer than hinges 310B and 310C. However, of course these relations can be varied.

Optionally a latch may be included to fasten the free end of cover piece 310E to the edge of chassis 100, in the position of FIG. 3A. This can be, for example, a simple hook latch or a button snap or an elastic loop.

Figure 3B:
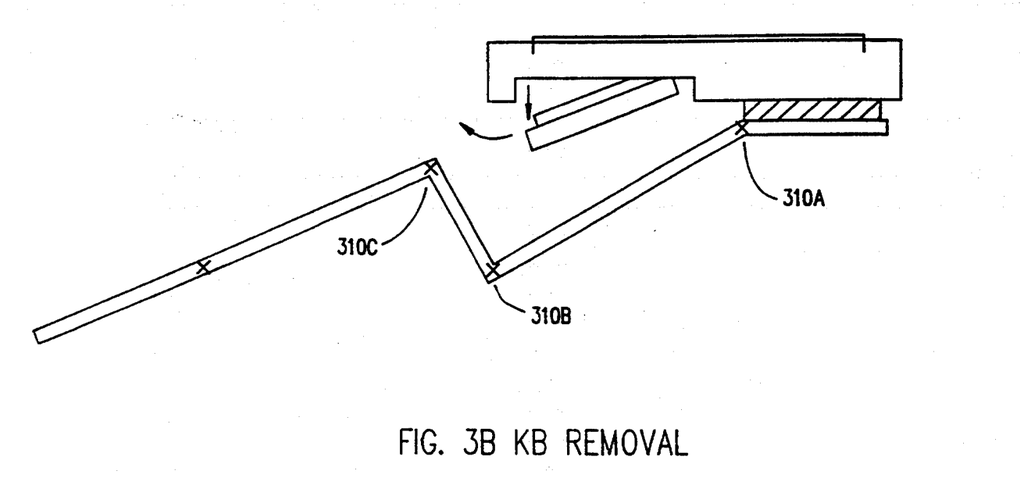

FIG. 3B shows how the cover 300 is folded back, at joints 310A and 310C, to permit removal of the keyboard 120 from its bay 102.

Figure 3C:
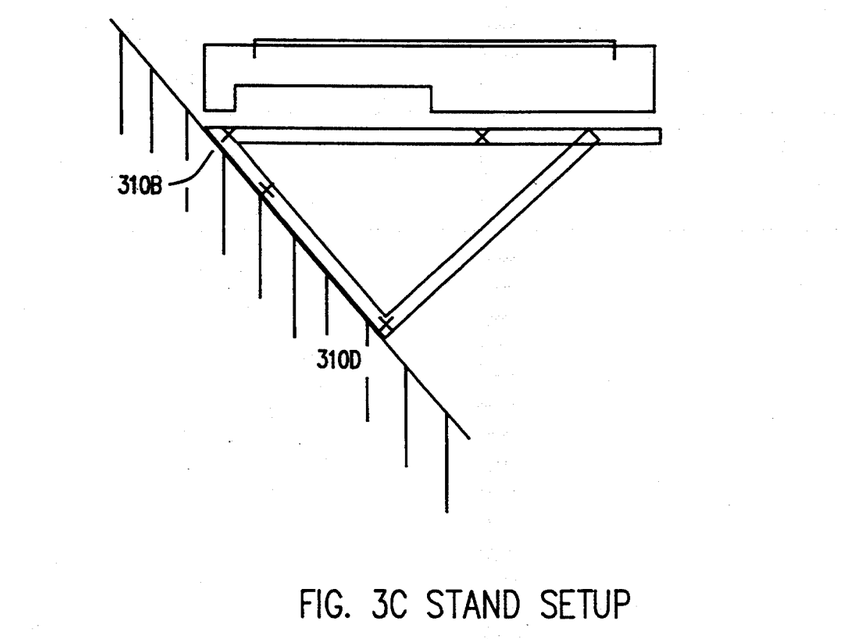

FIG. 3C shows the system of the presently preferred embodiment when the cover has been bent backward, at joints 310B and 310D, so that the free end of piece 3 10E is attached by the user to a desired location on the back of fixed piece 300A.

Figure 3D:
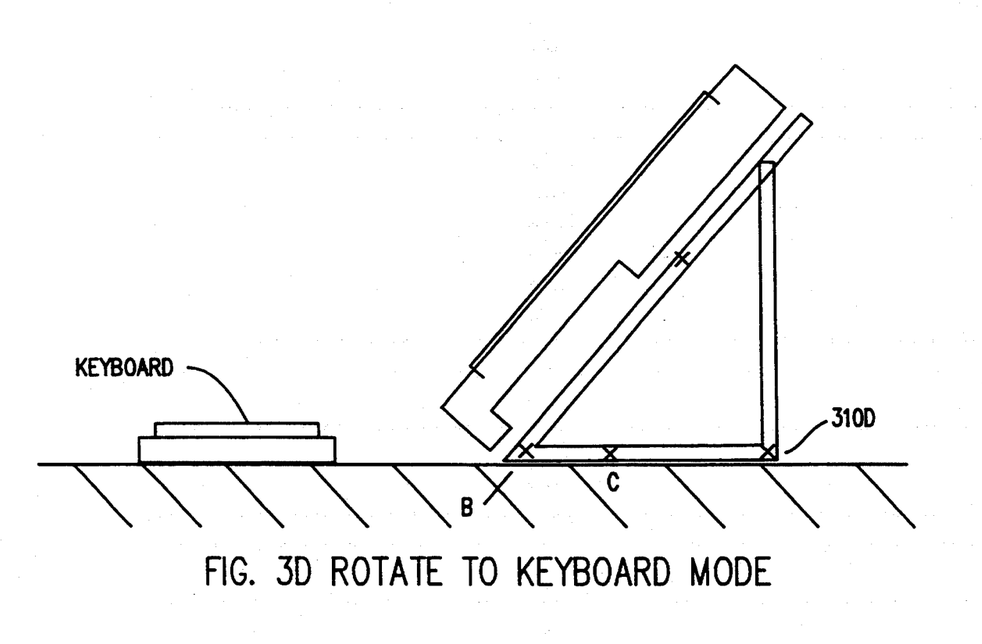

FIG. 3D shows the system of the presently preferred embodiment in the typing position. In this position the cover 300 supports the chassis 100 (and display 110) in an ergonomically correct position, while keyboard 120 is set out in front of the chassis 100.

Note that, in the position of FIG. 3D, joint 310C and pieces 300C and 300D are typically in tension. This causes the position of 3D to be stable despite the presence of this additional joint. That is, although four hinges are present in the folded cover, only two of these become vertices of the resulting triangular prism[5] shape.

[5]The term "prism," as used in this application, refers to a three-dimensional shape in which two ends (typically both planar) are joined by a set of sides whose long edges are all parallel in space. Thus, in the configuration of FIG. 3D, the first long side of the prism is provided by cover pieces 310A and 31013; the second long side is provided by cover pieces 310C and 310D; and the third is provided by cover piece 310E.

Note also that, in the position of FIG. 3D, joint 310A is not necessarily in tension, and may even be in compression. However, the rigid attachment of piece 300A, and the proximity of chassis 100 to piece 300B, prevent joint 310A from causing instability.

Note also that, in the position of FIG. 3D, the footprint of chassis 100 on its stand is actually less than that of the chassis lying flat. This is a significant advantage.

The contemplated best mode of making the folding cover is with a polymer material into which thin portions (for hinges) can easily be stamped. However, of course, a wide variety of other rigid or semi-rigid materials can be used instead. In general, any material which is stiff enough for the cover of a hardback book, and flexible enough for the hinge between a book's cover and spine, is usable for practising the present inventions.

Preferably the pieces of fine folding cover are not strictly flat, but are slightly upturned at their edges. This helps to provide additional rigidity without increasing weight. It is also contemplated, as an optional part of the best mode, that the cover can include indentations on its inner surface, complementary to any projections on the computer, for better protection. It is also contemplated, as an optional part of the best mode, that the cover can include decorative embossing on its outer surface.

Figure 3E:
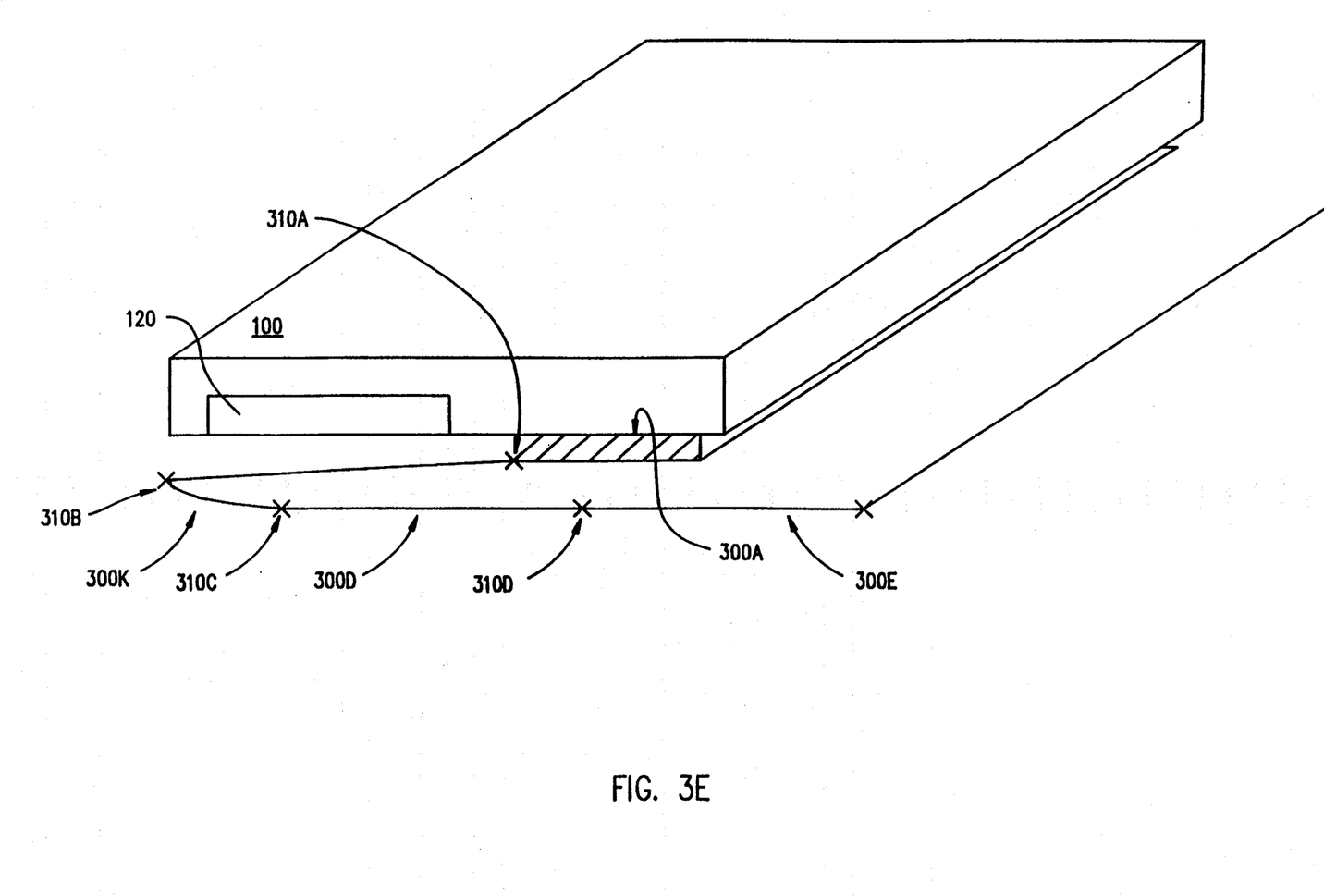
FIG. 3E shows a further folded configuration, of the same computer shown in FIGS. 3A, 3B, 3C, and 3D, in which the cover has been folded back for handheld stylus operation.

FIG. 3E shows a further folded configuration, of the same computer shown in FIGS. 3A–3D, in which the cover has been folded back for handheld stylus operation. This configuration gives an additional operating position, in which the computer chassis can be held in one hand (and preferably cradled on the user's forearm).

To achieve the configuration of FIG. 3E, joint 310B is preferably made flexible enough to bend backwards at a 180 degree angle. Note that, in the configuration of this Figure, piece 300E sticks out past the edge of the chassis; but preferably joint 310D too is matte flexible enough to bend backwards at a 180 degree angle, so that, for further comfort in the cradled handheld position, piece 300E can be folded back to lie flat against piece 300D.

Example of Internal Hardware

Figure 4A:
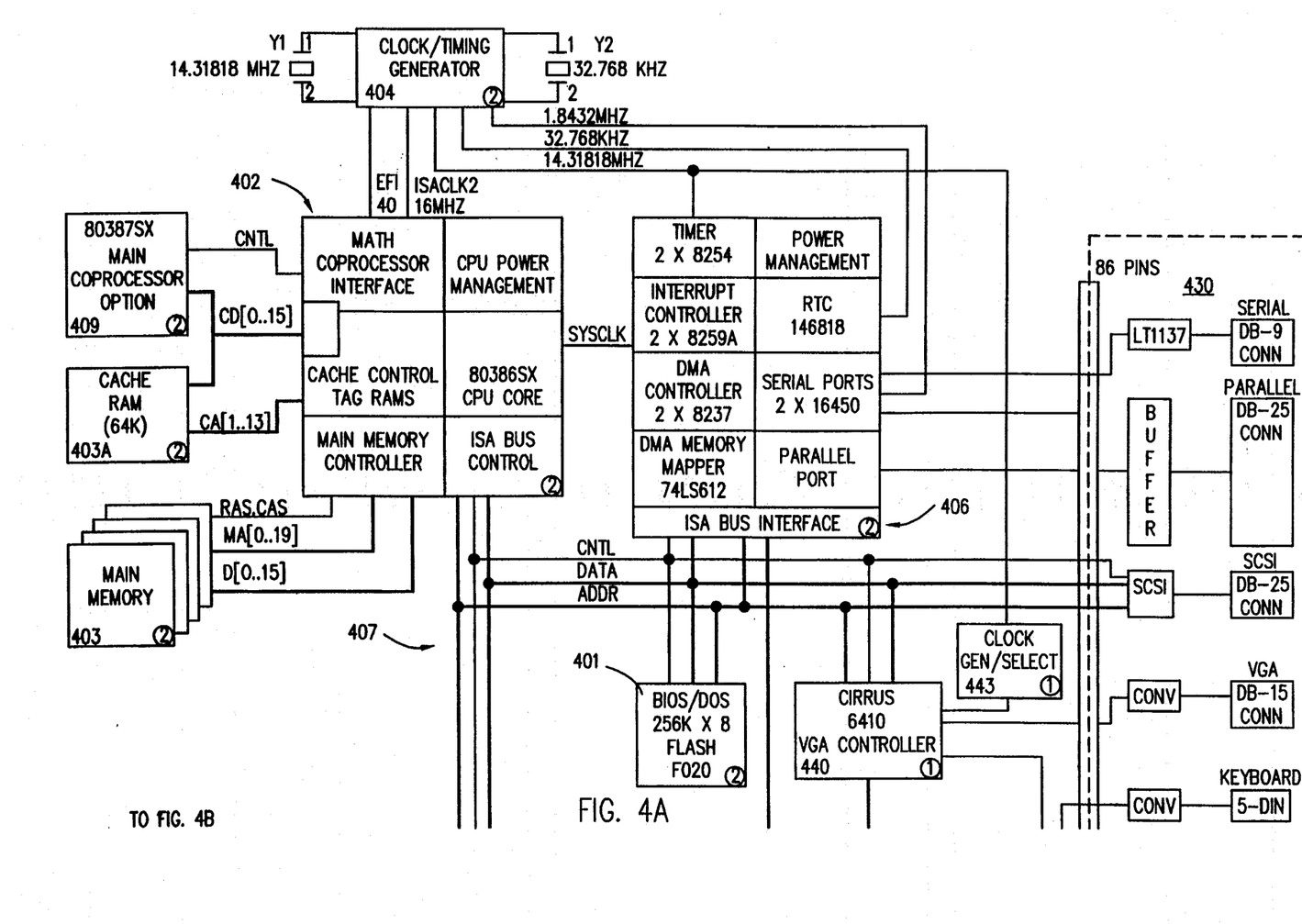
FIG. 4 shows a block diagram of the electronic organization of a sample pen- and keyboard-operated computer according to FIGS. 3A, 3B, 3C, 3D and 3E.
Figure 4B:
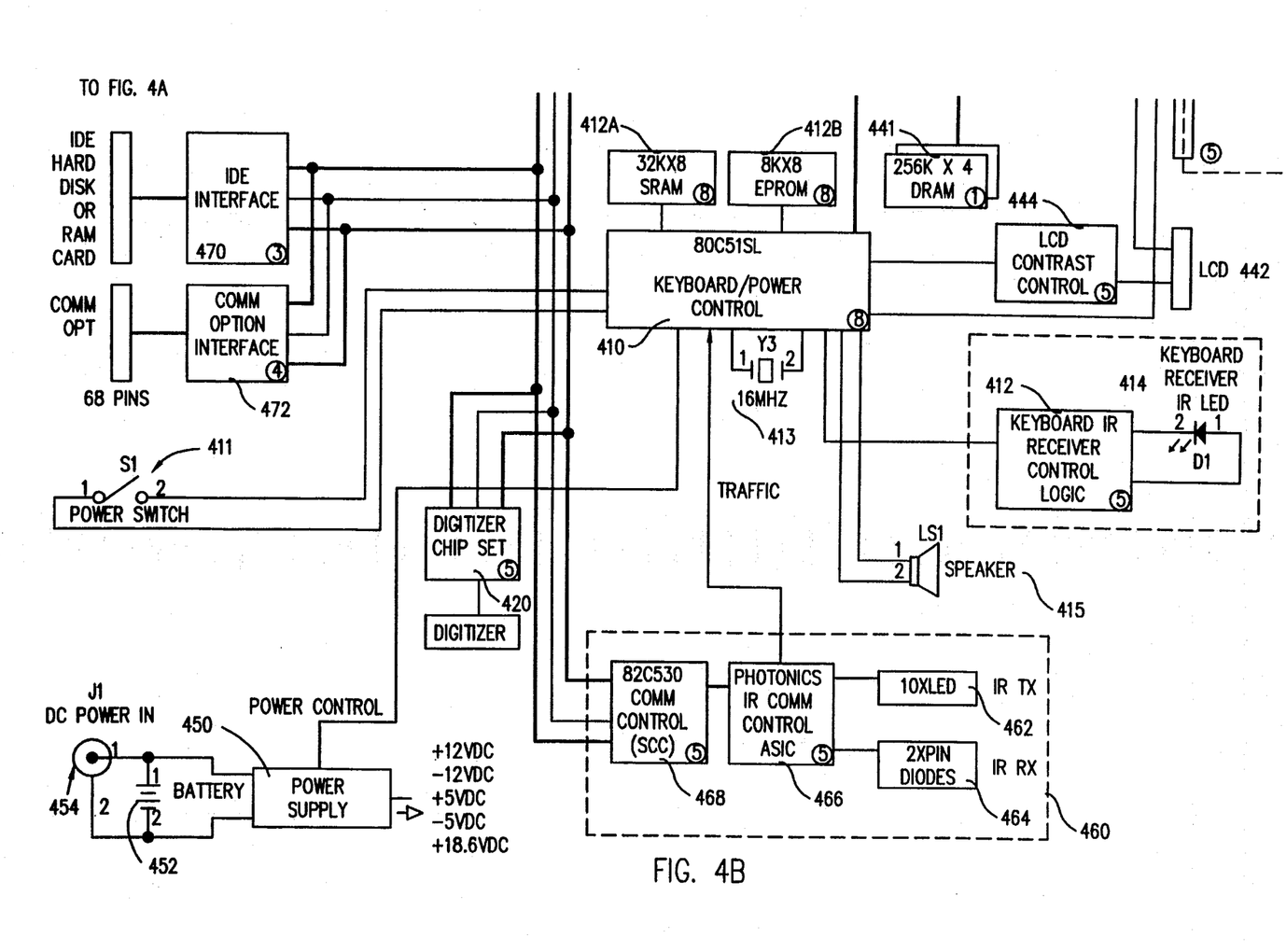

FIG. 4 shows a block diagram of the electronic organization of a sample pen- and keyboard-operated computer. (Of course, other organizations can be used instead; this organization is provided merely as one example of a context for use of the claimed inventions.)

In this example, a processor chipset 402 and 406, similar to the Intel 386SL chipset, is used. (Of course, a very wide variety of other chipsets can be used instead.) Chip 402 includes the 386SX processor core, and also includes ISA bus control logic (connected to ISA bus 407). Chip 402 also includes memory controller logic (connected to main memory 403 by 20 address lines, 16 data lines, and RAS and CAS strobe signals). Chip 402 also includes cache control tag RAMs (connected to cache RAM 403A). Chip 402 also includes math coprocessor interface logic (connected to optional math coprocessor 409). Chip 402 also includes CPU power management logic. Chip 402 receives a clock input (16 MHz in this example) from clock/timing generator 404.

Chip 406 is connected to receive clock line SYSCLK from chip 402. Chip 406 also includes timer logic (approximately equivalent to two 8254s), which is connected to receive a 14.31818 MHz clock signal from clock generator 404. Chip 406 also includes interrupt controller logic (approximately equivalent to two 8259As). Chip 406 also includes DMA controller logic (approximately equivalent to two 8237s). Chip 406 also includes bus interface logic which is connected to the bus 407. Chip 406 also includes power management logic, and a real-time clock (approximately equivalent to a 146818), which is connected to receive a 32.768 KHz signal from clock generator 404. Chip 406 also includes serial port control logic (approximately equivalent to two 16450s), which is connected to receive a 1.8432 MHz signal from clock generator 404.

Flash EPROM 401 contains code for BIOS and for the operating system (e.g. DOS). This chip, in the presently preferred embodiment, is a 256K×8 memory.[6]

[6]See commonly-owned U.S. patent application 706,750, filed May 29, 1991 (DC-200), which is hereby incorporated by reference. This application discloses a computer system in which the basic system software can be electrically rewritten. This system provides some significant safeguards against data corruption.

A microcontroller 410 (an 80C51SL, in the presently preferred embodiment) monitors user inputs to the soft power switch 411, and also receives keyboard inputs (through photodiode 414 and associated control logic 412). Associated with this microcontroller are SRAM 412A (32K×8 in this sample embodiment), EPROM 412B (8K×8 in this sample embodiment), and resonant crystal 413 (16 MHz in this sample embodiment). This microcontroller is also connected to control speaker 415.

Microcontroller 410 is also connected to a medium-speed general-purpose two-way wireless interface, implemented by logic 460. This logic includes an array of several (e.g. ten) LEDs 462 for transmission, and an array of two infrared PIN diodes 464 for reception. This interface provides the capability for a highly flexible portable wireless interface, which can provide (in effect) the capability of a self connecting and self-configuring LAN, with the proper software. These diodes are driven by an IR communications driver 466 (which, in the presently preferred embodiment, is a Photonics chip), and interface to bus 407 through control chip 468.

Microcontroller 410 is also connected to LCD contrast control logic 444. This logic, together with video signals from the VGA controller 440 (which is a Cirrus 6410 in the presently preferred embodiment), controls the LCD display 442. VGA controller 440 is also connected to local DRAM 441, and a programmable pixel clock 443.

Also connected to bus 407 is an IDE interface 470, which is connectible to the internal hard disk drive (or to a semiconductor mass-memory drive emulation, if a diskless configuration is chosen). Also connected to bus 407 is optional interface logic 472, which can be connected to a modem or a LAN interface card.

Also connected to bus 407 is a digitizer chip set 420, which is connected to detect and measure the movements of the computer's stylus.

Power supply 450 is driven by battery 452, and also be powered by in input socket 454. This power supply, in the presently preferred embodiment, provides output voltages of ±5 V, ±12 V, and ±18.6 V. However, of course, lower logic supply voltages may be used in future embodiments.

An "I/O Slice" 430 plugs into the side of the computer's chassis 100 using a special 86-pin connector. This connector expansion unit provides industry-standard connectors for serial ports (DB-9), parallel ports (DB-25), SCSI interface (DB-25), and for optional docking to external display (DB-15 VGA) and/or keyboard (DIN 5-pin) units.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A portable handheld computer selectively useable in either a keyboard or stylus input mode, comprising:
a hand holdable chassis structure having an elongated, generally rectangular configuration with opposite end portions, opposite front and rear sides extending between said opposite end portions, and an elongated recess formed in said rear side and longitudinally extending between said opposite end portions, said chassis structure further having disposed therein a CPU, a primary power supply, a program memory, and an infrared data receiver to receive signals from an infrared transmitter;
display means fixedly secured to said front side of said chassis structure and to provide a visible image corresponding to keyboard input signals transmitted to said CPU, said display means to sense the position of a user-operated stylus positioned against said display means and responsively transmit stylus position signals to said CPU; and
a wireless keyboard having keys dimensioned for touch-typing, said keyboard having an elongated, generally rectangular configuration and being positionable in (1) a stylus use orientation in which said keyboard is removably and complementarily received in said recess in said rear side of said chassis structure to permit a user to hold the entire computer in one hand while using a stylus on said display means to input data to said CPU, and (2) in a keyboard use orientation in which said keyboard is removed from said recess and positioned in a spaced apart relationship with said chassis structure with no physical connection thereto, said wireless keyboard having disposed therein a power supply and an infrared transmitter to transmit keyboard input signals to said infrared receiver when said keyboard is in said keyboard use position.

2. The portable handheld computer of claim 1 wherein:
said opposite end portions of said chassis structure terminate in oppositely facing end faces,
said recess opens outwardly at opposite ends thereof through said oppositely facing end faces, and
said keyboard has a length substantially equal to the distance between said oppositely facing end faces of said chassis structure.

3. The portable handheld computer of claim 1 further comprising:
latch means carried by said chassis structure and operative to engage said wireless keyboard and releasably retain it in said stylus use orientation thereof within said rear side recess of said chassis structure.

4. The portable handheld computer of claim 1 further comprising:
a stylus useable in conjunction with said display means.

5. The portable handheld computer of claim 4 wherein:
said stylus has active electronic circuitry incorporated therein.

6. The portable handheld computer of claim 5 wherein:
said stylus further has wireless transceiver circuitry incorporated therein.

7. Computer apparatus comprising:
a primary system chassis having disposed therein a CPU, a primary power supply, a program memory, and an infrared data receiver to receive signals from an infrared transmitter, said primary system chassis further having a front side, a rear side, and a recess formed in said rear side;

display means fixedly secured to said front side of said primary system chassis and to provide a visible image corresponding to signals generated by said CPU, said display means to sense the position of a user-operated stylus positioned against said display means and responsively transmit stylus position signals to said CPU; and a wireless keyboard having keys dimensioned for touch-typing, said keyboard being positionable in a storage orientation in which said keyboard is removably received in said recess in said rear side of said primary system chassis, and alternatively in a use orientation in which said keyboard is removed from said recess and positioned in a spaced apart relationship with said primary system chassis with no physical connection thereto, said wireless keyboard having disposed therein a power supply and an infrared transmitter to transmit data signals receivable by said infrared data receiver.

8. The computer apparatus of claim 7 further comprising:

latch means carried by said primary system chassis to engage said wireless keyboard and releasably retain it in said storage orientation thereof within said rear side recess of said primary system chassis.

9. The computer apparatus of claim 7 wherein said computer apparatus is a hand-held computer.

10. The computer apparatus of claim 9 wherein:

said primary system chassis has an elongated, generally rectangular configuration with opposite end portions between which said rear side and said recess extend, said wireless keyboard has an elongated, generally rectangular configuration, and a length at least generally equal to the distance between said opposite end portions of said primary system chassis.

11. The computer apparatus of claim 7 further comprising:

a stylus useable in conjunction with said display means.

12. The computer apparatus of claim 11 wherein:

said stylus has active electronic circuitry incorporated therein.

13. The computer apparatus of claim 12 wherein:

said stylus further has wireless transceiver circuitry incorporated therein.

* * * * *